E. J. ARMSTRONG.
CLAM SHELL MACHINE.
APPLICATION FILED DEC. 6, 1916.

1,401,951.

Patented Jan. 3, 1922.
2 SHEETS—SHEET 1.

Inventor
Edwin J. Armstrong
By
Attorney

E. J. ARMSTRONG.
CLAM SHELL MACHINE.
APPLICATION FILED DEC. 6, 1916.
1,401,951.
Patented Jan. 3, 1922.
2 SHEETS—SHEET 2.
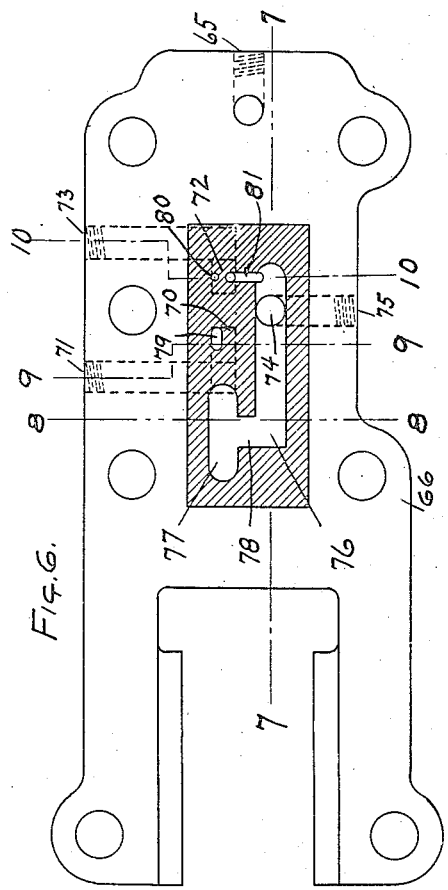
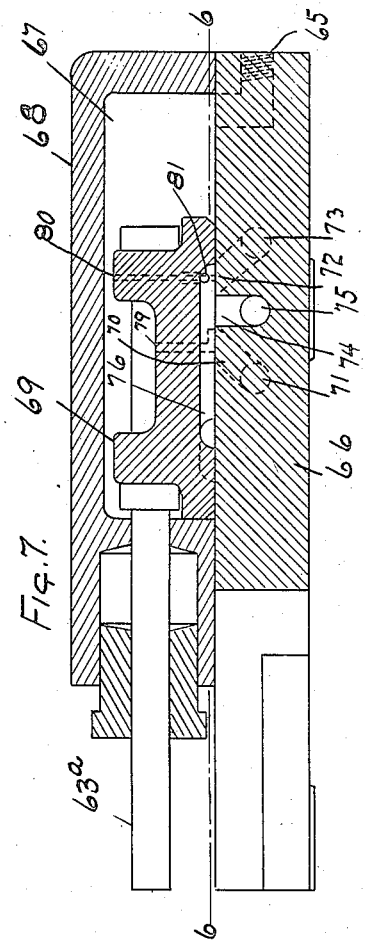
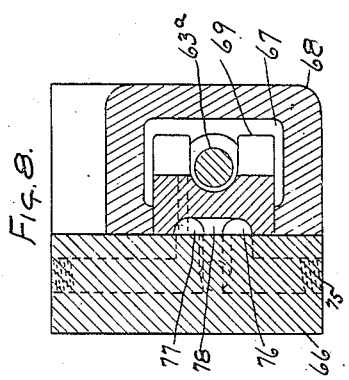
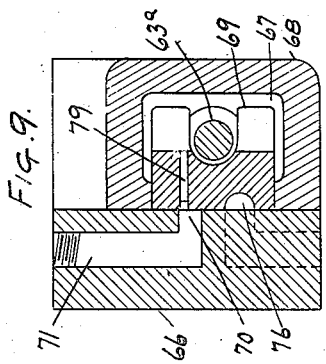
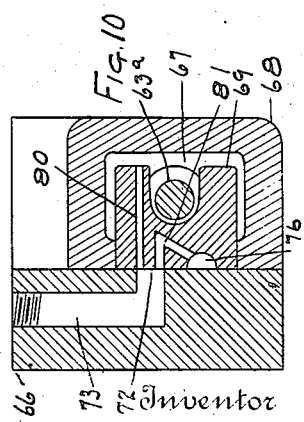
Inventor
Edwin J. Armstrong
By
Attorney

UNITED STATES PATENT OFFICE.

EDWIN J. ARMSTRONG, OF ERIE, PENNSYLVANIA, ASSIGNOR TO BALL ENGINE COMPANY, OF ERIE, PENNSYLVANIA, A CORPORATION OF PENNSYLVANIA.

CLAMSHELL MACHINE.

1,401,951.   Specification of Letters Patent.   Patented Jan. 3, 1922.

Application filed December 6, 1916. Serial No. 135,330.

*To all whom it may concern:*

Be it known that I, EDWIN J. ARMSTRONG, a citizen of the United States, residing at Erie, in the county of Erie and State of Pennsylvania, have invented new and useful Improvements in Clamshell Machines, which the following is a specification.

This invention relates to clam shell machines and consists in certain improvements in the construction thereof as will be hereinafter fully described and pointed out in the claims.

Mechanisms more generally used for steam shovels have been modified to adapt them for use with clam shells and the present invention as herein exemplified is arranged in connection with a steam shovel mechanism as ordinarily used.

The invention is illustrated in the accompanying drawings as follows:—

Fig. 1 shows a side elevation of the machine.

Fig. 2 an end view of one of the drums showing the clutch engaging the flange thereon.

Fig. 3 a vertical section of the drums showing the brake flange thereon.

Fig. 4 an end view of the driving gear for the closing drum, showing the clutch actuating mechanism, partly in section.

Fig. 5 an end view of the gear driving the hoisting drum showing the clutch actuating mechanism in elevation.

Fig. 6 an enlarged view of the clutch actuating valve on the line 6—6 in Fig. 7, the valve chest cover being removed.

Fig. 7 a section on the line 7—7 in Fig. 6.

Fig. 8 a section on the line 8—8 in Fig. 6.

Fig. 9 a section on the line 9—9 in Fig. 6.

Fig 10 a section on the line 10—10 in Fig. 6.

1 marks the frame of the machine, 2 the supporting wheels, 3 the swinging platform mounted on the frame, 4 a boom extending from the platform, 4ª a brace extending from the boom to the strut 4ᵇ on the platform, and 5 a clam shell, the clam shell comprising the jaws 6 pivoted on the pin 7. The links 8 are pivotally connected with the jaws 6 at 9 and at 10 with the pulley block 11. A hoisting line 12 is secured to the boom at 13 and runs through the hoisting block 11 and through a pulley 14 on the end of the boom to the hoisting drum 15. A pulley block 16 is attached to the pivot pin 7 of the jaws 6. The pulley block 17 is suspended from the block 11. A closing line 18 is run through the blocks 16 and 17 and carried over a pulley similar to 14 at the end of the boom and back to the closing drum 19.

With an understanding of the operation of the clam shell the mechanism for operating it this may be more readily understood. As shown in Fig. 1 the shell is open and the load discharged. At this point both lines 18 and 12 are released. The line 12 running through a pulley affords a greater resistance than the line 18. The clam shell therefore, descends in its open position. This result is more surely accomplished by reason of the weights 20 which are hung on the pin 7. With the clam shell in this open position on the material, the line 18 is then drawn in. Inasmuch as there are several wraps of the line 18 between the pulleys 17 and 16, these pulleys are drawn toward each other with a great deal more force than the lifting force of the line 18 on the clam shell. The effect, therefore, is a downward pressure on the pulley 17 and the consequent downward push of the links 8 with a consequent closing movement of the jaws 6. This movement is continued until the jaws are closed.

It is obvious that the shell might be lifted by the line 18 and if this were done there, of course, would be no tendency for the jaws to open but inasmuch as the load must be otherwise supported when the shell is open, it is desirable to have the load lifted by the same means that supports it when it is being opened and this is done with the hoisting line 12 so that there is no transfer of load at the moment of opening the shell. It is necessary, however, to maintain tension on the line 18 as the shell is lifted in order to maintain it in its closed position. As shown the line 12 extends through the block 11, thus giving it a lifting power advantage. There is, however, an unequal travel of the lines 18 and 12 as the shell is lifted, not only because of this difference in the running of the lines with relation to the shell but also an unavoidable difference in the wrapping of the lines on the drums. One of the difficulties, therefore, in a device of this kind is to lift the shell while maintaining tension on the closing line.

After the shell has reached the top of its travel, the boom is swung to the desired position, the line 12 is held and the line 18 played out, thus permitting of the opening of the jaws through the action of the weights on the pivot 7. These movements are accomplished with a great deal of rapidity and in a very convenient manner in the present invention. The usual mechanism is arranged on the platform, such as a boiler 21, the pipe 22ª connecting the boiler with the engine 22. The engine shaft 23 drives a gear 24 and the gear 24 drives a hoisting drum gear 25. The hoisting drum is mounted on the drum shaft 26 and the drum shaft is journaled in the frame or posts 27. The hoisting drum gear 25 meshes the closing drum gear 28. The closing drum 19 is mounted on the drum shaft 29 and the drum shaft is carried by the posts or frame 30.

Each drum is provided with a clutch flange having a clutch surface 32. A clutch band 33 operates upon the clutch surface 32. A bolt 34 is secured to one end of the band 33 and a head 35 is adjustably secured between the nuts 36 on the bolt 34.

An eye bolt 37 extends through an opening 37ª on the gear 28 in the drum gear. The opposite end of the band 33 is provided with a bearing loop 38 through which a crank pin 39 extends. The crank pin is mounted on a shaft 40. So far as described this clutch mechanism is one of common construction. When the shaft 40 is rocked the crank pin 39 sets or releases the clutch band 33 thus locking or releasing the drum from the drum gear.

In the structure shown, the clutches are fluid actuated. A pipe 41 is connected with an opening 42 axially arranged in the drum shaft 29. A pipe 43 connects the passage 42 with a cylinder 44. The cylinder is secured to the drum gear by means of a pin 45. The piston 46 operates in the cylinder and is connected by a rod 47 with a rock arm 48, the rock arm being fixed on the shaft 40. A spring 49 extends from the rock arm 48 to a lug 50 arranged on the cylinder 44.

When fluid under pressure is delivered to the cylinder 44 it actuates the piston, forcing the rock arm 48 outwardly, thus rocking the crank shaft 40 and tightening the band 33. When the cylinder is relieved of pressure, the spring 49 returns the rock shaft. A pipe 51 is connected with an opening 52 arranged at the axis of the drum shaft 26. A pipe 53 extends from the passage 52 to a cylinder 54, this cylinder being connected by a pin 55 with the drum gear 25. A connecting rod 56 extends from the piston, (not shown) similar to the piston 46, to the rock arm 58. A rock arm 58 is fixed on the shaft 40 of the drum gear 25. A spring 59 extends from the rock arm 58 to a lug 60 on the cylinder. The operation of this mechanism is similar to the mechanism operating the clutch on the closing drum just hereinbefore described. These clutches have been heretofore provided for devices of this kind.

I have provided a valve mechanism for operating these clutches which will automatically take care of the difference in travel between the lines during the lifting. A valve 61 is mounted on the frame. It is operated by a hand lever 62 which is connected to the valve stem 62ª by a link 63. Steam is supplied to the valve by a pipe 64, the pipe extending from the engine connection by way of the pipe 22ª and to an inlet opening 65 in the valve plate 66. The valve chest 67 is formed by the valve cover 68 which is secured on the plate 66. A valve 69 operates over the valve plate 66. The stem 63ª is secured to this valve. The movement is communicated to the valve by the links and lever heretofore described. The valve plate has a port 70 leading to the passage 71 in the plate 66, the passage 71 being connected with the pipe 51 leading to the clutch on the hoisting drum.

A port 72 is also arranged in the face of the plate 66 and in alinement with the port 70. The port 72 is connected with the passage 73 and the passage 73 is connected with the pipe 41 leading to the clutch mechanism on the closing drum.

An exhaust port 74 is arranged in the face of the plate 66 at one side of the ports 70 and 72 and it is connected with the exhaust passage 75 leading to the outer air or a convenient point of discharge.

The valve has an exhaust passage 76 which is at all times open to the exhaust port 74. The passage 76 is connected with a valve port 77 by a cross passage 78, the valve port 77 being in alinement with the ports 70 and 72 in the plate 66. A valve port 79 extends through the valve and is adapted to be brought into register with the ports 70 and 72 so as to deliver steam to these ports. A restricted valve port 80 also extends through the valve and is adapted to be brought into register with the port 72. A restricted discharge passage 81 extends from the face of the valve to the exhaust port 76, the end of the restricted passage 81 at the face of the valve being located to be brought into register with the port 72 simultaneously with the valve port 80.

The operation of the valve mechanism is as follows:—With the valve in its extreme position to the right, the opposite from that shown in the figures, the exhaust port 77 will bridge both the ports 70 and 72 and connect these ports by way of the cross passage 78 with the exhaust port 76 so that the clutches on both the closing and hoisting drums will be released. In this condition the clam shell would fall through its weight, pulling and unwinding the lines in its descent. The valve is then moved toward the left, bringing the valve port 79 into register with the port 72, leaving the valve port 77 still in register with the port 70. Under these conditions, steam will be admitted by way of the valve port 79, port 72, passage 73, pipe 41 and the intermediate connections to the fluid actuated clutch on the closing drum, thus setting this clutch. The closing line 18 will then be drawn in closing the clam shell. Immediately this is accomplished, the valve is moved to the left to the position shown in Figs. 6 to 10. This will bring the port 79 into register with the port 70 and will cut off the port 77 from both the ports 70 and 72. Steam passing through the port 79, port 70, passage 71 will be delivered by way of the pipe 51 to the fluid actuated clutch on the hoisting drum. This will set the hoisting line 12 in motion, thus hoisting the clam shell.

Steam will at the same time be admitted by way of the valve port 80 to the port 72 and passes from the port 72 by way of the passage 73 and pipe 41 to the fluid actuated mechanism of the closing drum so that the clutch of the closing drum will be set and this line will be kept in motion. It is here that the difficulty heretofore mentioned exists. If the closing line 18 is drawn in more rapidly than the line 12, or the line 12 is drawn in more rapidly than the line 18, one or the other of these lines will be slack and the operation of the mechanism interfered with. It is particularly desirable to have these two drums operated from the same engine as it is possible with this construction to utilize the ordinary steam shovel mechanism for this purpose.

To obviate the difficulty suggested, I vary the action of the clutch on the closing drum so that the engagement of the clutch will not be sufficient to lift the clam shell. Under these conditions, this line will not lift the load but will be maintained under tension. When the port 80 is brought into register with the port 72, the restricted passage 81 is also brought into register with the passage 72 so that steam is exhausted through the passage 81 from the port 72 to the exhaust port 76. By proportioning the capacity of the restricted passage 81 with relation to the port 80 which is also restricted, the pressure on the clutch of the closing drum may be reduced to any degree desired. If the passage 81 is very minute as compared to the port 80, the steam pressure reaching the clutch will approximate the steam pressure in the valve chest but if the passage 81 is very large as compared with the port 80, then it will exhaust the steam delivered through the port 80 with very little restriction so that the pressure on the clutch will be a little above the pressure in the exhaust port. It will be readily seen, therefore, that the pressure which is delivered to the closing drum clutch may be reduced to the extent desired so as to give to the engagement of this clutch just sufficient tension to the line 18 to maintain the clam shell in closed position, or the engagement of the clutch may be sufficient to make the pull on the line 18 a factor in the lifting of the clam shell.

It will be noted that these different actions of the valve are accomplished with a single controlling lever through a single valve, thus assisting the operator in the control. This is a matter of very great consideration because in devices of this kind the operator has the different controlling mechanisms to handle.

In order that the frictional engagement of the clutch on the closing drum may be more positively adjusted, I have provided a yielding stop for this clutch mechanism which will accomplish this purpose. A stop lever 82 is pivotally mounted on a pin 83 on the closing drum gear. A spring 84 extends from the lever 82 to a lug 85 on the gear. A stop shoulder 86 on the rock lever 48 contacts, as the rock arm 48 is moved, the stop face 87 on the stop lever 82. At this point it is opposed by the spring 84 which is under tension and the movement of the rock arm 48 is thus, therefore, arrested so long as the piston is subjected to the reduced pressure brought about by the passage 81. The position of the stop face 87 is accurately fixed by the stop 86 and the clutch band 33 is adjusted by means of the nuts 36 on the bolt 34 so as to give just the desired engagement with the flange 32 when the stop 86 is in contact with the stop face 87.

When the closing drum is pulling the line 18 to close the shell, the full force of the clutch is desired. As hereinbefore described, the initial operation of the valve brings the valve port 79 into register with the port 72. Under these conditions the full valve chest pressure is delivered to the clutch on the closing drum and this pressure is sufficient to overcome the yielding stop 87 and to set the clutch band 33 tightly upon the flange 32.

In the operation of the clam shell, therefore, the rock arm 48 is first moved out to the stop 88 until the line 18 closes the shell and then with the movement of the valve bringing the ports 80 and 81 into register with the port 72, the rock arm 48 moves inwardly to a position bringing the lever 82 into contact with the stop 86.

When it is desired to discharge the clam shell it is necessary to hold the line 12 while the line 18 is released. To accomplish this a brake is provided for the hoisting drum. The hoisting drum has the usual brake haisting line; a closing drum for the closing one end of the brake band being secured to a rod 91 and the opposite end to a lever 93 fixed on the rod 91. The flange 89 is at the opposite side of the machine from the operator and consequently the rod 91 is carried across the machine. A foot lever 94 is fixed on the rod 91 in position to be operated by the operator handling the controlling lever 62. When the operator gets the clam shell to a position desiring discharge, he throws the valve to the extreme right position, thus bringing the port 77 into register with both ports 70 and 72, and thus releases both clutches. By setting the brake on the hoisting drum, the line 12 is held while the lin 18 is released. The brake is held until i is desired to drop the clam shell, when the release of the brake releases the hoisting drum and the lines are played out allowing the shell to drop onto the material.

It will be noted that the hoisting drum has, by reason of the pulley 11 and the attachment to the boom, a power advantage over the closing line 18 which leads directly over the end of the boom. This simplifies the control in which the clutch controlling the closing is permitted to slip as the load is lifted, because closing operates faster on the load and also with the said pull has less lifting power. The excessive slip may be relieved by varying the size of the drums, but this should not be carried to a point where the speed of the closing line as affecting the bucket would not be greater than the hoisting line.

What I claim as new is:—

1. In a machine of the class described, the combination of a clam shell; a hoisting line; a hoisting drum for said line; a closing line; a closing drum for said closing line; fluid actuated clutches for said drums; and a valve device controlling said clutches comprising means to connect the hoisting clutch with the supply and the closing clutch with the supply; and comprising devices for reducing the supply pressure on the closing clutch and a single control for the valve device.

2. In a machine of the class described, the combination of a clam shell; a hoisting line; a hoisting drum for said line; a closing line; a closing drum for said closing line; fluid actuated clutches for said drums; and a single valve device controlling said clutches comprising means to connect the hoisting clutch with the supply and the closing clutch with the supply and comprising devices for reducing the supply pressure on the closing clutch.

3. In a machine of the class described, the combination of a clam shell; a hoisting line; a hoisting drum for said line; a closing line; a closing drum for said closing line; fluid actuated clutches for said drums; and a valve device controlling said clutches comprising means to connect the hoisting clutch with the supply and the closing clutch with the supply and comprising a restricted discharge for the fluid going to the closing clutch for reducing the pressure on said clutch.

4. In a machine of the class described, the combination of two drums; two lines running from said drums to a single load; a single drive for both drums having relation to the lines to wind them simultaneously; clutches for said drums; and mechanism for setting both clutches comprising devices for actuating both clutches and comprising means for automatically varying the engagement of one of the clutches to keep the tension on both lines as they are wound comprising a yielding stop.

5. In a machine of the class described, the combination of two drums; two lines running from said drums to a single load; a single drive for both drums having relation to the lines to wind them simultaneously; clutches for said drums; and mechanism for setting both clutches comprising devices for actuating said clutches and comprising means for automatically making the engagement of one of the clutches insufficient to move the load, said means comprising a yielding stop for the clutch actuating mechanism.

6. In a machine of the class described, the combination of two drums; two lines running from said drums to a single load; a single drive for said drums having relation to the lines to wind them simultaneously; clutches for said drums; and devices for actuating said clutches to operate one of said drums alone and for operating said drums simultaneously with the other drum and when operating with the other drum comprising means for automatically varying the relative engagement of the clutches to keep tension on both lines comprising a yielding stop for said clutch actuating devices.

7. In a machine of the class described, the combination of a clam shell; a hoisting line; a closing line; a hoisting drum for the hoisting line; a closing drum for the closing line; fluid actuated clutches for said drums; and a valve device controlling said clutches comprising means for setting the closing clutch alone and for controlling said clutches to act simultaneously and comprising means for automatically varying the pressure on the closing clutch when operating simultaneously with the hoisting clutch comprising a yielding stop.

8. In a machine of the class described, the combination of a clam shell, a hoisting line connected to the shell in position to hoist the shell; a closing line acting on the shell to close the same and connected in position to hoist the shell; a hoisting drum for the hoisting line; a closing drum for the closing line; a single driving means for said drums having relation to the drums and lines to give the hoisting line a power advantage and the closing line a speed advantage; and clutches for said drums adapted to act simultaneously and to permit slippage on the closing drum clutch.

9. In a machine of the class described, the combination of a clam shell; a hoisting line connected to the shell in position to hoist the shell; a closing line acting on the shell to close the same and connected in position to hoist the shell; a hoisting drum for the hoisting line; a closing drum for the closing line; a single driving means for said drums having relation to the drums and lines to give the hoisting line a power advantage and the closing line a speed advantage; and clutches for said drums adapted to act simultaneously and automatically to effect slippage on the closing drum clutch.

10. In a machine of the class described, the combination of a clam shell; a hoisting line connected to the shell in position to hoist the shell; a closing line acting on the shell to close the same and connected in position to hoist the shell; a hoisting drum for the hoisting line; a closing drum for the closing line; a single driving means for said drums having relation to the drums and lines to give the hoisting line a power advantage and the closing line a speed advantage; clutches for said drums adapted to act simultaneously and to permit slippage on the closing drum clutch; and controlling means to first set the closing drum clutch and then both clutches with the clutch on the closing drum automatically in slipping engagement.

11. In a machine of the class described, the combination of a clam shell; a hoisting line connected to the shell in position to hoist the shell; a closing line acting on the shell to close the same and connected in position to hoist the shell; a hoisting drum for the hoisting line; a closing drum for the closing line; a single driving means for said drums having relation to the drums and lines to give the hoisting line a power advantage and the closing line a speed advantage; clutches for said drums adapted to act simultaneously and to permit slippage on the closing drum clutch; and controlling means to first set the closing drum clutch and then both clutches with the clutch on the closing drum automatically in slipping engagement and then releasing both clutches.

12. In a machine of the class described, the combination of a clam shell; a hoisting line connected to the shell in position to hoist the shell; a closing line acting on the shell to close the same and connected in position to hoist the shell; a hoisting drum for the hoisting line; a closing drum for the closing line; a single driving means for said drums having relation to the drums and lines to give the hoisting line a power advantage and the closing line a speed advantage; clutches for said drums adapted to act simultaneously and to permit slippage on the closing drum clutch; controlling means to first set the closing drum clutch and then both clutches with the clutch on the closing drum automatically in slipping engagement and then releasing both clutches; and a brake for the hoisting drum.

13. In a machine of the class described, the combination of a clam shell; a hoisting line running to the shell in position to hoist the shell; a closing line acting on the shell to close the same and connected in position to hoist the shell; a hoisting drum on which the hoisting line is wound; a closing drum on which the closing line is wound; clutches for said drums; and controlling devices for the clutches for setting and releasing said clutches simultaneously and for varying the relative engagement of the clutches to automatically keep the tension on both lines as they are wound and to permit both to run free when released.

In testimony whereof I have hereunto set my hand.

EDWIN J. ARMSTRONG.